Aug. 18, 1970 W. D. COSKI 3,524,606
CABLE REEL MOUNTING
Filed March 12, 1968

INVENTOR.
WILLIAM D. COSKI
BY
Bernard J. Murphy
AGENT

# United States Patent Office 3,524,606
Patented Aug. 18, 1970

3,524,606
CABLE REEL MOUNTING
William D. Coski, Mercer Island, Wash., assignor to Lawrence Manufacturing Company, Seattle, Wash., a corporation of Delaware
Filed Mar. 12, 1968, Ser. No. 712,438
Int. Cl. B65h 54/28, 75/00
U.S. Cl. 242—158                              7 Claims

ABSTRACT OF THE DISCLOSURE

A mounting for a cable reel rotatable on an X axis which allows the reel to swivel on a Y axis automatically to facilitate level winding of cable to and from the reel.

---

This invention pertains to a mounting for a cable reel and in particular to a swivel mounting automatically effecting level winding of the cable to and from the reel.

Cable reels which are known in the prior art have fixed-base mountings and mechanically driven level wind devices. These devices comprise a guide which moves along the length of the reel, bidirectionally, to direct the cable in successive windings. The devices must be integrated with the reel rotation so that the movement thereof will be paced by the speed of the cable pay-out or retrieval. Some of these level wind devices require certain adjustments, from time to time, and all of them are subject to repeated mechanical failure.

The known level wind devices have the priorly noted means for sweeping along the length of the reel, but then, if the cable must be directed to the narrow confines of a pilot hole, as is common in mining operations, guide pulleys are used to direct the cable around a gross fleet angle (i.e., the angle of cable lay with respect to the radial plane of reel rotation) to reach the pilot hole. The pilot hole comprises one narrow channel perpendicular to the centerline of the reel rotation, but the cable feed therethrough must approach from both laterally-extending sides of the reel. Only the cable centrally wound on the reel can feed linearly to the hole. The end windings of the cable on the fixed-mounted reel must transverse a sharp angle or be fed about idler pulleys to address the pilot hole with some measure of linearity. The sharp angling, or threading of the cable about pulleys, subjects cable to early fatigue failure.

It is an object of this invention therefore to provide a reel mounting which eliminates the need for driven level wind devices. Another object of this invention is to provide a reel mounting with means automatically operative to effect winding and unwinding of cable only within a given range of cable fleet angles. A feature of this invention comprises the mounting of a cable reel on a trunnion which provides a free swiveling of the reel to effect level winding of the cable.

Further objects and features of this invention will become more apparent by reference to the following description taken in conjunction with the accompanying figures in which.

Figure 1:
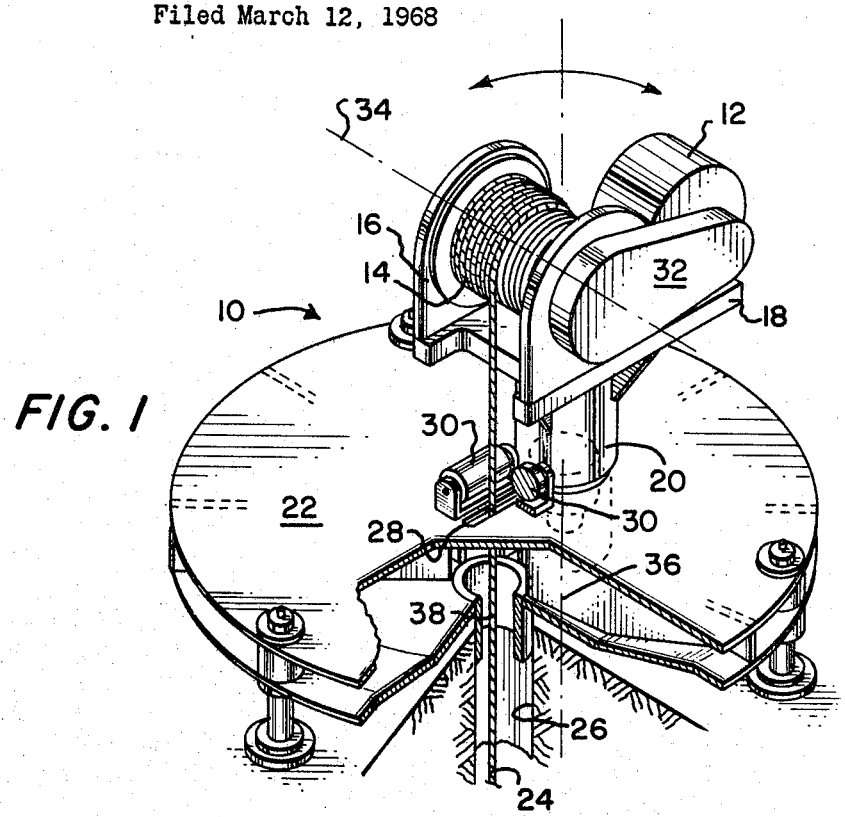
FIG. 1 is a perspective view of a cable reel with the novel mounting according to the invention.

As shown in FIG. 1 a reel assembly 10 is driven by a reel motor 12 and comprises a reel 14 carried rotatably on a support 16. The foregoing components are mounted in common on a platform 18 which has integral therewith, and extending from the side of the platform which is opposite the reel and motor mounting side, a trunnion shaft 20. A base 22 receives therewithin, and supports, a smaller diameter portion of shaft 20 with appropriate bearings (not shown), for free, swiveling motion relative thereto.

Cable 24 extends from the reel 14 and feeds to a confined pilot hole 26 through a slot 28 which is formed in the base 22. A pair of rollers 30, one of which is shown fragmented so that slot 28 might be seen, are arranged in parallel along slot 28 to accommodate cable 24 therebetween so that the cable can pass through slot 28 without friction. My preferred embodiment teaches the use of rollers 30. Clearly, though, alternate embodiments which use other types of anti-friction guides—such as Teflon side skirts, or whatever—can be practiced without departing from the spirit of my invention.

A drive transmission 32 communicates power from the reel motor 12 to reel 14 for rotation of the reel on the rotary axis, an X axis, 34. Shaft 20 allows a swiveling of the reel assembly 10 about the swivel axis, a Y axis, 36. The cable line of suspension 38 is that portion of cable 24 which is suspended in pilot hole 26 from the rollers 30. It is a teaching of my invention to provide the swivel Y axis 36, in a plane parallel with the line of suspension 38, or substantially parallel therewith.

Figures 2, 3, 4:
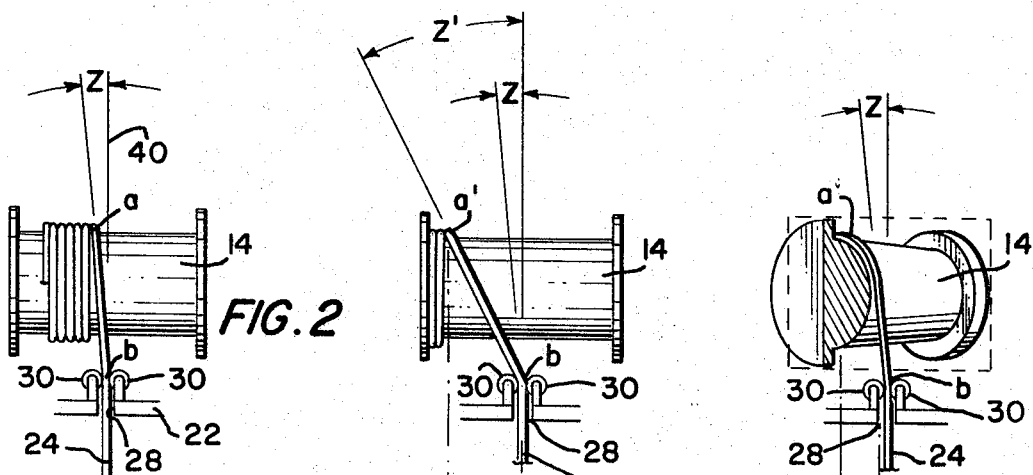
FIG. 2 is a schematic sketch of a front elevational view of the reel of FIG. 1 in one operative position.
FIG. 3 is a schematic sketch of a front elevation of the reel of FIG. 1 which illustrates the gross fleet angle which would occur in the absence of the novel mounting according to the invention.
FIG. 4 is another schematic sketch of a front elevation of the reel according to FIG. 1 in a further operative position.

As can be seen in FIG. 2 the radial plane 40 of the radius of rotation of reel 14 defines a standard from which the cable fleet angle Z is determined. The fleet angle Z is defined, relative to plane 40, by the cable lay, i.e., the cable "fleet line," between points $a$ and $b$. Point $a$ is that at which cable departs from or returns to reel 14, and point $b$ is that at which cable passes between the rollers 30. As long as cable is returned to or payed-out from the central portion of reel 14, the fleet angle Z is very narrow; fleet angle Z is roughly equivalent to the helix angle of stored, unpayed-out cable on reel 14. By reference to FIG. 3 it can be seen that if the reel assembly 10 were fixed in its mounting, as it is represented to be in the figure, then the pay-out or retrieval of cable from reel 14 at either end thereof would define a very gross fleet angle Z' between points $a'$ and $b$. The gross fleet angle Z' encompasses a broad lateral displacement N of cable 24 from the end-of-the-reel point of feed $a'$ on reel 14 to point $b$.

According to the invention, the reel assembly 10 is freely swivel-mounted so that as cable is withdrawn from or retrieved by either ends of the reel 14, the reel responsively turns on shaft 20 so that the cable 24 can more linearly address the pilot hole 26. This is shown in FIG. 4 where reel 14 in solid line, as compared to a non-swiveling reel in dashed-line, has turned on the swivel axis, the Y axis, 36. A lateral adjustment of the cable fleet line has been effected by the swiveling motion. That is, point $a'$ has moved laterally a distance of N' with respect to what would have been the location of point $a'$ (FIG. 3). Thus, cable 24 nearly linearly feeds to the pilot hole 26. The narrow fleet angle Z has been maintained. Reel 14 will proceed to turn in the alternate direction as cable is fed from or to the other reel end which is opposite point $a'$. Accordingly, cable is payed-out from or stored on reel 14 by means of an automatic, non-mechanically-driven level wind arrangement effected through the novel swivel mounting.

With tension on cable 24, and point *a* (see FIG. 2) tending to be laterally displaced from point *b*, a side force is exerted against that roller 30 which is more proximate to point *a*. As the rollers 30 cannot be moved laterally in response thereto, the side force is then manifest as a pulling or drawing of reel 14 in sidewise and downward directions. As a resolved result of these sidewise and downward urgings, to neither of which it can respond directly, reel 14 swivels about the Y axis 36. This motion satisfies the side force, for as the reel turns on Y axis 36, it effectively and relatively moves point *a'* (FIG. 4) sidewise. Additionally, with the turning of reel 14 on Y axis 36, the cable length between points *a'* and *b* shortens. Very simply, what I am pointing out is that the hypotenuse of the Z angle is shorter than that of the Z' angle. Thus, cable length maintained between points *a'* and *b* in FIG. 4 is relatively "shortened" as compared to the cable length between points *a'* and *b* as shown in FIG. 3. The shortening of that cable length simulates a lowering of reel 14 relative to the rollers 30; it simulates a response to the downward pull of the cable tension.

Figure 5:
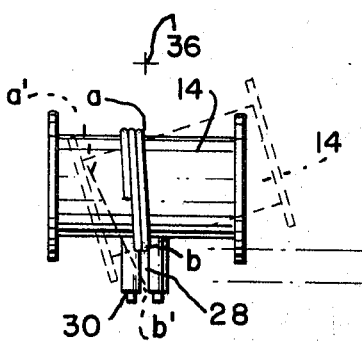
FIG. 5 is a schematic swetch of the reel of FIG. 1 in a plan view showing the displacement of the line of cable suspension as the reel swivels on the novel mounting.

FIG. 5 represents a plan view schematic of the reel 14 in solid line, as such a view of the FIG. 1 positioning of the reel thereof would appear, and superimposed thereon in dashed line a plan view of the FIG. 4 positioning of the reel. The swivel axis, Y axis 36, it is to be noted, is spaced from the rotary X axis 34. This displacement, or spacing, limits the intrusion of the reel 14 over slot 28, and is necessitated to balance the weight of motor 12 and reel 14 on the swivel axis, the Y axis 36. To avoid this displacement it is proposed, as an alternate embodiment of the invention, to mount the motor 12 and reel 14 in a surmounting relationship. This might be preferable as it would facilitate a more proximate relationship between the swivel axis, Y axis 36, and the cable line of suspension 38, to minimize any bending effects in the swivel mounting. In FIG. 5, then, it is shown graphically how it is that, as reel 14 swivels on Y axis 36, the end of reel 14 on which is located point *a'* is moved forwardly, as well as sidewise, so that the line of extension of cable 24 is displaced forwardly along slot 28. This forward cable displacement is represented by the movement of the cable fleet line from the *a–b* positioning thereof to the *a'–b'* (FIG. 4) positioning. The forward displacement *c* of the cable fleet line, the spatial distance between points *b*, and *b'*, is fully accommodated by the extent of slot 28 and the length of rollers 30.

As noted in the foregoing, cable tension will cause forces to operate on rollers 30 and the swivel mounting to swivel reel 14 to maintain a narrow cable fleet angle. As cable pay-out point *a* (FIG. 2) moves toward an end of reel 14, the reel will swivel in pace therewith. As cable is reeled in, the same effect is achieved.

On reeling in of cable 24, there is developed the same priorly-noted side force. This force arises, in fact, from the effect of tension on cable 24 which tends to straighten—and to keep straight—cable 24. As the fleet angle increases, or as the tension increases, the tendency of cable 24 to straighten increases proportionately. The cable 24 winds on reel 14, successive helical coils thereof nesting against the immediately preceding coil. The cable 24 will not store successive coils thereof on reel with wide spaces therebetween. This is so because reel 14 will not swivel on the Y axis 36, to present a wide space from the last-stored coil, as this would require the lay of the cable, i.e., the disposition of its "fleet line," at a gross fleet angle. As previously explained, the trunnion provisioning, the free swivel mounting of the reel 14, will not tolerate or offer a wide fleet angle. Cable 24, reeling in for storage on reel 14, then, will slide along side the last-wound coil thereof.

Earlier I had noted that axis 36 shall be parallel, or substantially so, with cable line 38. By this I mean that, ideally, the swivel mounting of my invention is most effective, is more smoothly responsive, when axis 36 is absolutely parallel with line 38. Yet, the pilot hole 26 has a gross diameter with respect to the smaller gauge of cable 24. Accordingly, cable 24 may have occasion to be slightly angulated in its suspension within pilot hole 26. In fact, the work to which cable 24 is put could very well require a slue of cable 24 across the diameter of hole 26, or even a swinging rotation therewithin. Such slight deviation of cable 24 from parallelism with axis 36 will not have any pronounced effect on the efficiency of my novel mounting. So also, conversely, if, for whatever reason, it should not be possible to establish axis 36 in true parallelism with cable 24, my mounting will function as explained herein. However, if axis 36 is markedly angulated, with respect to line 38, imbalances will militate against the gradual, even level winding taught by my invention. Conceivably, those skilled in the art might use the teaching of my invention to fashion a mounting swiveled on an axis perpendicular to axis 34 and at a right angle to axis 36. Yet such a structure would necessitate some resilient means to return the reel 14 to equilibrium each time it is swiveled or tilted to either end, or power means to power the swiveling-tilt. Such arrangements, however, would be more unwieldy and as given to mechanical failure, as those now known in the prior art.

I have described my invention in connection with a reel assembly (10, FIG. 1) from which a cable 24 is suspended therebelow. Of course, this is done only by way of example. By simply arranging the weight and balance of the components mounted on platform 18 in an equalizing manner, with respect to Y axis 36, my invention is equally adaptable to a horizontal disposition in which the cable could work a drag line or the like. Likewise, my FIG. 1 structure could be inverted, and the cable 24 reached to a pulley or the like for suspending an elevator, or the like, therefrom. In any of these applications, my novel mounting, coupled with the rollers 30, will level wind the cable and pass it through a confined pilot hole or similar cable channel through no more than a narrow fleet angle.

Throughout I have noted the work-piece supporting element as a "cable." Clearly, though, by definition I mean "cable" to embrace rope, wire, and like filamentary materials as are commonly used with a reel, winch, hoist and such related devices.

Therefore, while I have described my invention in connection with a specific embodiment thereof it is to be clearly understood that this is done only by way of example and not as a limitation to the scope of my invention as set forth in the objects thereof and in the appended claims.

I claim:

1. A mounting, for a cable reel rotatable on a longitudinal X axis, comprising:
   a base;
   means for supporting said reel for rotation about said X axis, said means being mounted on said base for free, swiveling movement thereof, relative to said base, about a Y axis which is perpendicular both to said X axis and to said base; said base having means for guiding cable for movement thereof on a line parallel with said Y axis, and for constricting such guided cable against lateral excursions relative to said line, said guiding and constricting means being cooperative with said supporting means automatically to effect level winding of cable on said reel.

2. A mounting, according to claim 1, wherein:
   said cable guiding and constricting means comprise means carried on said base for guiding cable through said base.

3. A mounting, according to claim 1 wherein:
   said guiding and constricting means and said supporting means are cooperatively responsive to tensioning of cable extending from said reel to cause said supporting means to swivel said reel about said Y axis.

4. A mounting, according to claim 1, wherein:
   said supporting means comprise a trunnion.

5. A mounting, according to claim 1, wherein:
said guiding and constricting means comprise a slot formed through said base, and a pair of anti-friction guides carried on said base and mounted in parallel along said slot, one guide adjacent each side of said slot, whereby cable payed-out from and reeled onto said reel frictionlessly passes through said slot by passing between said guides 6. A mounting, according to claim 1, wherein:
said Y axis is spaced from said X axis 7. A mounting, according to claim 1, wherein:
said guiding and constricting means comprise a pair of rollers.

References Cited

UNITED STATES PATENTS 2,998,094   8/1961   Fisher _____ 242—158 X

FOREIGN PATENTS 470,224   1/1929   Germany.

STANLEY N. GILREATH, Primary Examiner

U.S. Cl. X.R.

254—190